United States Patent [19]
Peren et al.

[11] 3,897,635
[45] Aug. 5, 1975

[54] INSTRUMENTS FACILITATING THE PLOTTING OF A COURSE

[75] Inventors: Karl Gunnar Magnus Perén, Saltsjobaden; Stig Åke Gösta Svensson, Sodertalje, both of Sweden

[73] Assignee: Malix AB, Saltsjobaden, Sweden

[22] Filed: June 7, 1974

[21] Appl. No.: 477,337

[30] Foreign Application Priority Data
June 19, 1973 Sweden.............................. 7308598

[52] U.S. Cl...................... 33/189; 33/1 C; 33/76 V
[51] Int. Cl.² ............................................ B43L 9/08
[58] Field of Search ............. 33/189, 1 C, 20 B, 28, 33/76 UA, 75 B

[56] References Cited
UNITED STATES PATENTS

| 1,529,293 | 3/1925 | Beulwitz | 33/189 |
| 1,969,939 | 8/1934 | Nelson | 33/76 VA |
| 2,191,396 | 2/1940 | Nomura | 33/189 |
| 2,426,480 | 8/1947 | Wood | 33/189 |
| 2,557,981 | 6/1951 | Larsen | 33/76 VA |

*Primary Examiner*—Richard E. Aegerter
*Assistant Examiner*—Willis Little
*Attorney, Agent, or Firm*—Karl W. Flocks

[57] ABSTRACT

The invention relates to an instrument facilitating the plotting of a course on a chart, map and the like, said instrument comprising a graduated lens and a pointer movable relative to said lens. The novel matter of the invention resides in that the lens is formed as a convex lens and provided with a peripheral support ring defining underneath said lens a space for the pointer. The support ring is at least partly made from a material which prevents sliding movement of the instrument on the chart or map.

8 Claims, 3 Drawing Figures

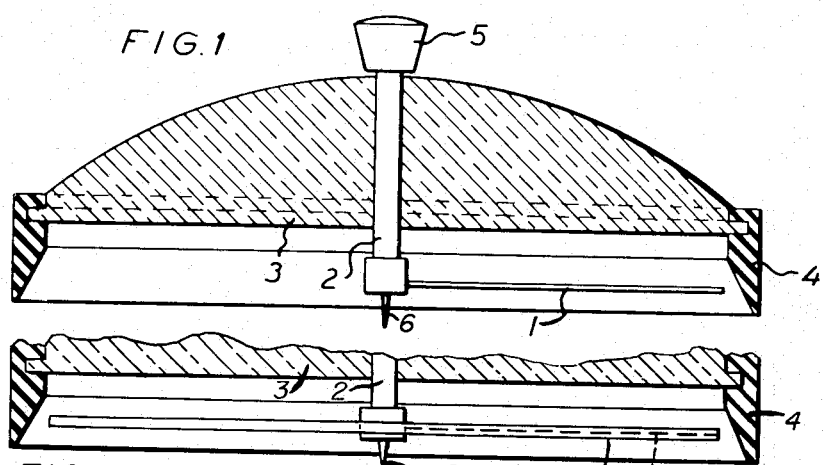
FIG. 1
FIG. 1A
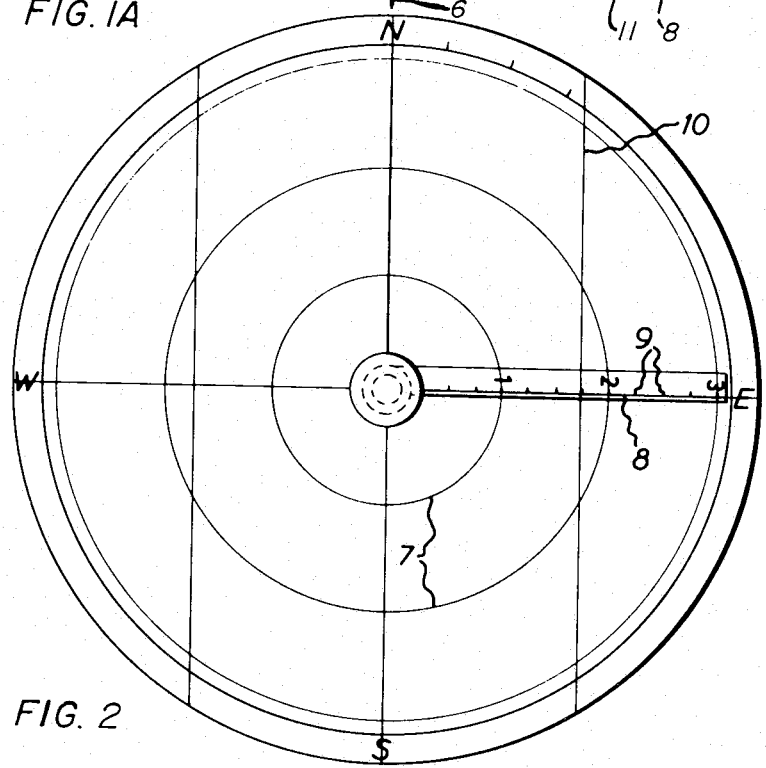
FIG. 2

INSTRUMENTS FACILITATING THE PLOTTING OF A COURSE

The present invention relates to an instrument facilitating the plotting of a course from a given point on a chart, a map or the like, comprising a pointer assembly temporarily fixable at and rotatable about said given point into a direction coinciding with the desired course, said pointer assembly comprising a pointer mounted under a transparent graduated lens.

The invention has for its object to provide a simple but efficient instrument facilitating orientation from a chart or map and capable of indicating the distance from a given point of departure. The instrument according to the invention is substantially characterized in that the pointer is attached to a pin rotatably mounted in a central bore in the lens which is formed as a convex lens, and that the lens is supported by a peripheral ring defining underneath said lens a space for the pointer and consisting at least partly of rubber or like material preventing sliding movement of the instrument on the chart or map.

Embodiments of the instrument according to the invention will now be described in more detail in the following, reference being had to the accompanying drawing in which:

FIG. 1 is a cross-sectional view of the instrument;

FIG. 1A is a partial cross-sectional view of another embodiment of the instrument; and FIG. 2 is a top plan view of the instrument in the embodiment of FIG. 1.

In its simplest form, the instrument could consist of a pointer attached to a pin serving as a handle and equipped with a needle for localizing said pin on the chart or map. In this form, however, the instrument would be rather difficult to handle.

In the preferred embodiment, the pin 2 which serves as a handle and attachment for the pointer 1 is mounted in the center of a transparent lens 3 provided at its periphery with a support ring 4. In the embodiment illustrated, the lens 3 is formed as a convex lens to facilitate reading of the chart and is attached to the ring 4 so that the underside of the lens is spaced from the plane in which lies the lower edge of the ring 4. The pointer 1 which is attached to the pin 2 is adapted to move within the space between said underside and said plane.

A knob 5 is mounted on the upper end of the pin to facilitate rotation thereof, and at the lower end a needle 6 may be provided. The pin also is axially movable relative to the lens 3 so that the needle can be held away from the base when the instrument is moved. To prevent unintentional movement of the pin, its mounting should be provided with some suitable braking means, for instance a ring of rubber or like material pressed into an annular groove in the center bore and/or the pin.

The lens 3 is provided with a number of concentric markings 7 spaced apart to correspond to a given distance according to the chart or map scale.

The pointer may consist simply of a needle or the like but, in the first embodiment illustrated, is a tongue 1 of transparent material on which a course line 8 and a graduation 9 are provided. As indicated in the partial cross-sectional view of FIG. 1A, it is also possible to form the pointer as a substantially circular, rotatable disc 11 having a diameter smaller than that of the disc 3 and carrying a course line and a suitable graduation as shown drawn on pointer 1 in FIG. 2.

The support ring 4 is made of rubber or like material and thus also serves to protect the instrument against impacts. Owing to the structural nature of the material and because the lower edge is formed with a taper, sliding movement of the instrument on the chart or the like is effectively prevented, regardless of whether or not the needle 6 has been fitted.

Index lines 10 for the north-south direction of the chart may be provided on the lens 3 as well as on the support ring 4, and to establish correspondence with a meridian additional index lines may be provided.

A protractor (not shown) may be disposed along the periphery of the lens 3 so that, when the instrument has been oriented on the chart and fixed by means of the needle 6 relative to a given point, the compass course can be read directly by setting the pointer 1 or dice 11 with its course line towards the desired destination.

The instrument may also be provided with lighting means underneath the disc.

The instrument is used in the following manner. Before placing the instrument on the chart and sliding it to the position from which a course is to be plotted, the operator, if the pin 2 is fitted with a needle 6, raises the pin so that the needle goes clear of the chart. When the point of departure has been reached, the operator depresses the pin so that the needle engages the chart and holds the instrument in position. The pointer is then adjusted towards the destination, and the instrument may then be left on the chart until a position has been reached from which a new course can be plotted.

The invention is not restricted to the embodiments described above and illustrated in the drawing, but can be modified in various ways within the scope of the appended claims.

What we claim and desire to secure by Letters Patent is:

1. An instrument facilitating the plotting of a course from a given point on a chart, a map or the like, comprising a pointer assembly temporarily fixable at and rotatable about said given point into a direction coinciding with the desired course, said pointed assembly comprising a pointer mounted below a transparent graduated lens, characterized in that the pointer is attached to a pin rotatably mounted in a central bore in the lens which is formed as a convex lens, and that the lens is supported by a peripheral ring defining underneath said lens a space for the pointer and consisting at least partly of rubber or like material preventing sliding movement of the instrument on the chart or map, said peripheral support ring having a downwardly tapering cross-section to form a narrow lower edge for engaging the chart or map.

2. An instrument as claimed in claim 1, characterized in that the pin is provided at its lower end with a needle that can be depressed into the chart or map and is axially displaceable within the bore of the lens.

3. An instrument as claimed in claim 1, characterized in that the pointer is an arm attached to the pin and radially projecting therefrom.

4. An instrument as claimed in claim 1, characterized in that the pointer is a transparent tongue attached to the pin and carrying a course line.

5. An instrument as claimed in claim 1, characterized in that the pointer is a circular disc attached to the pin and rotatable therewith, a course line being provided on said disc.

6. An instrument as claimed in claim 1, characterized in that the pointer is provided with a course line and with a distance graduation.

7. An instrument as claimed in claim 1, characterized in that the lens is provided with concentric markings indicating given distance.

8. An instrument as claimed in claim 1, characterized in that the lens is provided with lines for orienting it relative to said chart, and also with a peripherally disposed graduated scale.

* * * * *